2,721,796
Patented Oct. 25, 1955

2,721,796

LEACHING OF OXIDIZED NICKEL ORES BY PRESSURIZED AMMONIUM SULFATE

Patrick J. McGauley, Glen Cove, N. Y., assignor to Chemical Construction Corporation, New York, N. Y., a corporation of Delaware No Drawing. Application April 12, 1950, Serial No. 155,551

3 Claims. (Cl. 75—103)

The present invention is concerned with an improved method of leaching nickel-bearing ores. It is particularly concerned with the treatment of oxidized nickel ores and more specifically with the leaching of complex hydrated nickel silicate minerals.

Although nickel is a fairly commonly occurring metal in nature, it is usually found in oxidized form or combined with other metals. There are a relatively large number of known oxidized nickel deposits throughout the world which in the past could not be economically treated to recover the nickel content. This has been due to the lack of a satisfactory leaching or other concentrating process for isolating the nickel.

Such nickel-bearing minerals are most often found as complex hydrated nickel silicates or nickel alkaline-earth silicates. Among these, for example, are garnierite ($NiO \cdot SiO_2 \cdot xH_2O$) or genthite

$$(2NiO \cdot 2MgO \cdot 3SiO_2 \cdot 6H_2O)$$

Minerals of this type are seldom found in ores from which they can be satisfactorily leached by known methods. Neither acid nor ammoniacal leaching can be economically employed.

In many cases the nickel content of the ore may be soluble to some degree in aqueous acid solutions. Unfortunately this is not found particularly helpful. The mineral is usually found in an ore having gangue which is also soluble to a considerable degree. As a result, acid leaching is not practical due to the excessive acid consumption and the resultant excessively contaminated solutions.

On the other hand, the nickel content of such ores is not directly soluble in ammoniacal solutions. It often can be made so, however, if the ore is roasted under reducing conditions. Ordinarily such a double treatment of low grade nickel ores is uneconomical.

However, because the demand for metallic nickel is high and constantly increasing, there is a marked need for a suitable process whereby the nickel content can be dissolved into a comparatively uncontaminated solution. It is, therefore, the principal object of the present invention to devise a process suitable for use in meeting such a demand. A suitable process should be incorporated in a single operation and if possible not only should be more efficient but also simpler and more economical to operate than are those procedures which have been tried in the past.

In accordance with the present invention a process has been devised which fulfills these objects in a highly satisfactory manner. In general, the process involves two features. First, an aqueous solution of soluble ammonium salt of a strong acid, preferably ammonium sulfate, containing dissolved $H_2SO_4$ is used as the principal leaching liquor. Second, the actual leaching is carried out under novel and controlled conditions. It is carried out at relatively high temperature, preferably above 250° C., under equivalent pressure, preferably under a definite partial pressure of a reducing gas.

In the acidic solution, the pH should be below 6.5. Strongly acidic solutions containing up to 10% or higher of free acid may be used. Preferably, however, the acidic content will be in the range between a pH of from about 4 to about 6.0–6.5.

Ammonium sulfate is ordinarily used in relatively high concentration. Ordinarily about enough salt should be used so that the solution will be about one-third saturated at ordinary temperatures. Either a larger or a smaller amount may be used. A completely saturated solution is neither necessary nor desirable. More than about two-thirds saturation will seldom be used. About 70% of saturation is a good practical limitation. However, there must be present in the solution at least an amount equivalent to that required to convert all the nickel dissolved into a nickel sulfate-ammonium sulfate double salt i. e., one mol equivalent of $H_2SO_4$ and of $(NH_4)_2SO_4$ for each mol of nickel. In using acidic liquors, this salt will form in most cases. The solution should not be sufficiently concentrated in ammonium sulfate to precipitate the double salt, the solubility of which is decreased by increasing the concentration of ammonium sulfate.

With regard to the amounts and concentrations of solution used, certain precautions should be taken. The concentrations should be as high as practically possible in order to minimize the necessary amount of liquor. Because the reaction is carried out in the pressure vessel, it is undesirable to increase the apparatus demands by handling an unnecessarily dilute solution.

A good general practice in accordance with the present invention is to make a slurry of the ore concentrate with the leach liquor. Since leaching is done at elevated temperature, the liquor should be hot as practicable and, as noted, should be in substantially the minimum practicable amount. This slurry is further heated by being pumped into an autoclave or reactor, or a series of them, under pressure through a suitable heat exchanger in which heat is taken up from the exit liquor. Preferably, but not necessarily the reactor or reactors should be equipped for stirring in order to facilitate the leaching.

A definite partial pressure of reducing gases is preferable and is maintained in the autoclave. Using ammoniacal liquors, carbon monoxide appears to be preferable. Substantially any available industrial reducing gases containing CO and/or $H_2$ may be used for this purpose. However, if additional ammonia is required to complete the leaching, additional amounts may be introduced into the autoclave under pressure.

Operation of the autoclave is at increased temperature. Little or no leaching action appears to take place even on an amenable ore until a definite temperature of about 175°–200° C. is approached. Above about 225°–250° C. the rate of solution appears to take place at commercially-feasible rates and to increase with increasing temperature. Above about 450° C. will seldom be needed. However, temperatures may go as high as the available apparatus can withstand the equivalent pressure. Pressures above those equivalent to the operating temperature are not required.

After leaching, or continuously if a continuous system is set up, leached slurry is discharged from the autoclave or autoclave series. It may be depressurized and settled. It is preferable, however, to use a high pressure settling tank and high pressure filter in order to retain the sensible heat so far as possible. After removal of the solids, the exit liquor should be passed through a heat exchanger to heat the incoming feed, as noted above. The exit pulp is discharged, filtered, washed and ordinarily then discarded. If it contains additional desirable constituents, a further processing may be employed to recover them.

The filtrate leaving the heat exchanger is usually again filtered to provide a clarified solution of nickel-bearing liquor. The latter is then treated to recover a major portion of the nickel content by precipitation, chemically or electrolytically, according to presently-known methods which form no part of the present invention. The exit liquor after reduction and nickel collection is returned to the leaching cycle. The leaching agents content thereof is increased as may be necessary for this purpose.

I claim:
1. In the leaching of unroasted ores of hydrated nickeliferous silicates, the improved procedure which comprises: preparing a leach liquor comprising an aqueous solution of ammonium sulfate having dissolved therein sufficient $H_2SO_4$ to provide a pH less than about 6.5, the ammonium sulfate content thereof not exceeding about 70% that required for complete saturation; admixing the nickel-bearing ore with sufficient leach liquor to provide at least one mol equivalent of $H_2SO_4$ and one mol equivalent of ammonium sulfate for each mol of nickel in the ore; heating the slurry to a temperature above about 175° C. under an increased total pressure not less than the critical pressure at the operating temperature; continuing this treatment for sufficient time to dissolve substantially all the soluble nickel; discharging a slurry of leached ore and spent liquor and removing the residual solids therefrom.

2. A process according to claim 1 in which the liquor is an aqueous solution of ammonium sulfate containing dissolved $H_2SO_4$ and having a pH of about 4.0–6.5.

3. In the leaching of unroasted ores of hydrated nickeliferous silicates, the improved procedure which comprises: preparing a leach liquor comprising an aqueous solution of ammonium sulfate having dissolved therein sufficient $H_2SO_4$ to provide a pH less than 6.5, the ammonium sulfate content thereof not exceeding about 70% that required for complete saturation; admixing the nickel-bearing ore with sufficient leach liquor to provide at least one mol equivalent of $H_2SO_4$ and one mol equivalent of ammonium sulfate for each mol equivalent of nickel in the ore; heating the slurry to a temperature above about 175° C. under an increased total pressure not less than the critical pressure at the operating temperature, at least a part of the pressure comprising a positive pressure of a reducing gas; continuing this treatment for sufficient time to dissolve substantially all the soluble nickel; discharging a slurry of leached ore and spent liquor, and removing the residual solids therefrom.

References Cited in the file of this patent
UNITED STATES PATENTS

| | | |
|---|---|---|
| 2,520,958 | Poole et al. | Sept. 5, 1950 |
| 2,576,314 | Forward | Nov. 27, 1951 |

OTHER REFERENCES

Mellor, J.: "A Comprehensive Treatise on Inorganic and Theoretical Chemistry," 15, 21–22. Longmans, Green & Co., New York.

Liddell, D. M.: "Handbook of Nonferrous Metallurgy: Recovery of Metals," McGraw-Hill Book Co., Inc., New York (1948), pp. 595–596.